(12) United States Patent
Boev et al.

(10) Patent No.: US 12,210,159 B2
(45) Date of Patent: Jan. 28, 2025

(54) OPTICAL SYSTEM FOR A DISPLAY DEVICE

(71) Applicant: Huawei Technologies Co., Ltd., Shenzhen (CN)

(72) Inventors: Atanas Boev, Munich (DE); Hector Navarro Fructuoso, Munich (DE); Bogdan Cihodariu Ionita, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 637 days.

(21) Appl. No.: 17/504,340

(22) Filed: Oct. 18, 2021

(65) Prior Publication Data

US 2022/0035168 A1 Feb. 3, 2022

Related U.S. Application Data

(63) Continuation of application No. PCT/EP2019/060101, filed on Apr. 18, 2019.

(51) Int. Cl.
*G02B 27/01* (2006.01)
*G02B 26/08* (2006.01)
*G02B 27/14* (2006.01)

(52) U.S. Cl.
CPC ..... *G02B 27/0172* (2013.01); *G02B 26/0833* (2013.01); *G02B 27/14* (2013.01)

(58) Field of Classification Search
CPC . G02B 27/0172; G02B 26/0833; G02B 27/14
USPC .......................................................... 359/630
See application file for complete search history.

(56) References Cited

U.S. PATENT DOCUMENTS 5,982,343 A 11/1999 Iba et al.
2016/0147078 A1 5/2016 Bedard et al.

FOREIGN PATENT DOCUMENTS

| GB | 2442576 A | 4/2008 |
| WO | 2011014207 A1 | 2/2011 |
| WO | 2020007439 A1 | 1/2020 |

OTHER PUBLICATIONS

"DLP Technology for Near Eye Display," Application Report, Literature No. DLPA051A, White Paper, Total 18 pages, Texas Instruments Incorporated (Sep. 2014—Revised Aug. 2017).

(Continued)

*Primary Examiner* — Jerry L Brooks
(74) *Attorney, Agent, or Firm* — Leydig, Voit & Mayer, Ltd.

(57) ABSTRACT

An optical system for a display device for head mounting is described. In particular a Maxwellian display device, with an enlarged eye-box is described. The optical system includes a beam forming element configured to converge multiple sets of light beams into at least two points of convergence (e.g., on an exit pupil of the optical system or of the display device using the optical system), and at least one optical arrangement comprising an input for input light beams, at least one beam splitter and at least three reflectors. The at least one beam splitter and at least three reflectors are positioned to form the multiple sets of the light beams from the input light beams such that the multiple sets of the light beams have equally long beam paths from the input to the beam forming element. Each point of convergence is a convergent viewing point for a user, thus enlarging the eye-box.

17 Claims, 3 Drawing Sheets

(56) References Cited

OTHER PUBLICATIONS

Kramida "Resolving the Vergence-Accommodation Conflict in Head-Mounted Displays: A review of problem assessments, potential solutions, and evaluation methods," IEEE Transactions on Visualization and Computer Graphics, vol. 22, No. 7, Total 21 pages, Institute of Electrical and Electronics Engineers, New York, New York (Jul. 2016).

Lambooij et al., "Visual Discomfort and Visual Fatigue of Stereoscopic Displays: A Review," Journal of Imaging Science and Technology, vol. 53, No. 3, pp. 1-14, Society for Imaging Science and Technology (May-Jun. 2009).

Hu et al., "Design and Assessment of a Depth-Fused Multi-Focal-Plane Display Prototype," Journal of Display Technology, vol. 10, No. 4, Total 10 pages, Institute of Electrical and Electronics Engineers, New York, New York (Apr. 2014).

Wu et al., "Content-Adaptive Focus Configuration for Near-Eye Multi-Focal Displays," 2016 IEEE International Conference on Multimedia and Expo (ICME), Total 6 pages, Institute of Electrical and Electronics Engineers, New York, New York (Jul. 2016).

Narain et al., "Optimal Presentation of Imagery with Focus Cues on Multi-Plane Displays," ACM SIGGRAPH 2015, ACM Transactions on Graphics, vol. 34, No. 4, Article No. 59, Total 13 pages (Aug. 2015).

Shibata et al., "The zone of comfort: Predicting visual discomfort with stereo displays," J Vis., pp. 1-53 (2011).

Lin et al, "Retinal projection head-mounted display," Frontiers of Optoelectronics, Total 9 pages, Higher Education Press and Springer-Verlag Berlin Heidelberg 2016 (Mar. 2017).

OPTICAL SYSTEM FOR A DISPLAY DEVICE

CROSS-REFERENCE TO RELATED APPLICATIONS

This application is a continuation of International Application No. PCT/EP2019/060101, filed on Apr. 18, 2019, the disclosure of which is hereby incorporated by reference in its entirety.

TECHNICAL FIELD

The present disclosure relates to an optical system, a display device comprising such an optical system, a corresponding optical method, and a corresponding computer program product.

BACKGROUND

Near eye displays (NED) or head mounted displays (HMD) have recently received increasing attention in industry due to their ability to create a small, portable/mobile, personal viewing experiences. Existing NED are based on stereoscopic 3D displays by rendering depth perception of 3D scenes from pairs of 2D perspective images with binocular disparities presented at a fixed distance (focal plane) to the viewer. This creates an unnatural viewing condition due to the vergence-accommodation conflict (VAC) with adverse consequences, e.g., visual discomfort and fatigue, distorted depth perception.

Multi-focal-plane NED (MFD) are capable of alleviating the VAC and thus enabling true volumetric 3D rendering. In an MFD, multiple carefully placed, discrete focal planes divide an extended 3D scene volume into multiple zones along the visual axis. Virtual objects within a zone are rendered by the corresponding pair of adjacent focal planes such that the 2D perspective images of these objects are displayed at a nearly correct focal distance. MFD implementations can be categorized into spatially multiplexed or temporally/time multiplexed techniques. In the time multiplexed systems, the viewing distance of a single 2D display from the eye is rapidly switched in synchronization with the rendering of frames of multiple focal planes to create a flicker-free perception.

As one of the alternatives to address VAC, accommodation-free displays are employed. These kind of displays are generally based on the Maxwellian view principle. According to the Maxwellian view principle, diverging rays from a point light source are collimated by a lens and pass through an SLM screen (Spatial Light Modulator, e.g., a liquid crystal display (LCD) and organic light emitting diode (OLED)). Transparency of every pixel is controlled, forming an image, which is then directed by a converging lens into a tiny spot on the pupil. The image conjugate to the screen is formed on the retina with an extremely large focal depth. The challenge of this approach is that the convergence point of the rays needs to fall on the pupil. This poses geometric restrictions on the FOV (field of view) due to the eye rotation and pupil diameter.

A conventional HMD has a fixed focal point of images on display. Both real and virtual objects cannot be steadily observed because the observer can only accommodate one of them. Thus, the virtual object appears as a clear image, whereas the real object appears as a blurred image. In contrast, a Maxwellian view HMD effects that both the virtual object and the real object appear as clear images. However, the Maxwellian view is limited by its extremely narrow viewing area that requires the beams to strictly converge at the center of the crystalline lens.

Advantages of the Maxwellian projection are that an all-in-focus retinal projection is effected, that an image is created, which is always in focus regardless of the focal power of the eye, and that 3D objects are allowed to appear as close as 20 cm in front of the eye.

However, Maxwellian view is limited by its extremely narrow eye-box that requires the beam to strictly converge at the center of the crystalline lens. This narrow eye-box is insufficient to provide a convenient user viewing experience, thus limiting the deployment of such technology. In particular, the image projected into the user eye will be lost, when the eye rotates to a different angle, which is unsuitable for a consumer product.

For handling this problem, a set of optical components such as mirrors, retarders and polarizers may be used for generating multiple beams in order to extend the eye-box and allow a larger field of view. According to this approach, a rather unstructured beam splitter and mirror configuration is employed to generate the multiple beams. For such a configuration, the path equalization, which is required for guaranteeing a minimized spot size over the retina of an observer, needs to be inserted in an additional layer, however has a drawback that due to the unstructured configuration of the beam generation, a heuristic approach needs to be done to ensure equal paths by carefully compensating the offset distance for each beam.

SUMMARY

In view of the above-mentioned problems and disadvantages, illustrative examples provided in the disclosure aim to improve the optical systems for display devices currently on the market. An objective is in particular to provide an optical system for a display device suitable for head-mounting, which on the one hand has a simpler design (in particular, a reduced number of optical components and less complex optical components for the path equalization), but on the other hand has an enlarged eye-box. Further, the display device should be comparatively compact.

The objective is achieved by the embodiments provided in the enclosed independent claims. Advantageous implementations of the embodiments are further defined in the dependent claims.

In particular, illustrative examples provided in the disclosure address the above objective by using an optical arrangement to achieve equal optical paths of multiple beams, e.g. for a Maxwellian optical system, which is based on a tree structure, each branch of the tree structure starting with a beam splitter and ending with a reflector.

A first aspect of the disclosed illustrative examples provides an optical system, in particular a Maxwellian optical system, for a display device suitable for head-mounting. The optical system comprises a beam forming element configured to converge multiple sets of light beams into at least two points of convergence, for example on an exit pupil of the optical system or of the display device using the optical system. The optical system further comprises at least one optical arrangement comprising an input for input light beams, at least one beam splitter and at least three reflectors. The at least one beam splitter and at least three reflectors are positioned to form the multiple sets of the light beams from the input light beams such that the multiple sets of the light beams have equally long beam paths from the input to the beam forming element.

Each point of convergence is a convergent viewing point for one and the same image. The points of convergence may, for example, be located on an exit pupil of the optical system or of the display device using the optical system. Accordingly, a user of the optical system can see the image, for example through the exit pupil of the optical system, even if he or she rotates the eyeball. Therefore, the eye-box of the optical system or display device is effectively enlarged. The display device may notably be a Maxwellian display device, which does not suffer from the VAC. And due to the configuration of the optical arrangement, the design of the optical system becomes simpler. In particular, for providing an equal optical path for providing a minimized spot size over the retina of an observer for an improved user experience of the display, the optical arrangement does not require a polarizer and a retarder; furthermore, the optical arrangement requires for the equal optical path less mirrors. In other words, the disclosure overcomes the above-mentioned drawbacks by using less optical components (only semi and fully reflective optical components with zero optical power, i.e., (flat) mirrors and beam-splitters) and by using a structured tree algorithm to construct the optical path for each beam. Moreover, since the optical system facilitates that each convergent viewing point is created by light from the same light source, uniformity of the light before the user eye can be ensured.

In an implementation form of the first aspect, the at least one optical arrangement comprises at least one first beam splitter and at least a first, second and third reflector. The first beam splitter is positioned at a first branching point to split the input light beams at least in first light beams and second light beams; the first reflector is positioned to reflect the first light beams for forming at least a first set of the multiple sets of the light beams; and the second and third reflector are positioned to reflect the second light beams for forming at least a second set of the multiple sets of the light beams. Thus, the equally long beam paths of the multiple sets of the light beams are easily provided by the at least one first beam splitter and the three reflectors. In particular, only the at least one first beam splitter and the three reflectors are required for providing the first light beams and the second light beams for forming the two set of the multiple sets of the light beams.

In a further implementation form of the first aspect, the optical arrangement is configured to provide the at least two points of convergence on a circle, wherein the circle has a radius and a center; the at least one first beam splitter is positioned to direct the second light beams towards the center; and the first reflector is distanced from the at least one beam splitter at a first distance, wherein the third reflector is distanced from the second reflector at a second distance, and wherein each of the first distance and the second distance equals the radius, thereby directing the first set and the second set of the multiple sets of the light beams to the beam forming element for providing the at least two points of convergence on the circle. For example, having the at least two points of convergence to be positioned in a defined manner with respect to one another, the at least one first beam splitter and the reflectors can be easily positioned to one another, namely based on the predefined relative positioning of the at least two points of convergence.

In a further implementation form of the first aspect, the optical system further comprises at least one second beam splitter, and at least a fourth, fifth and sixth reflector. The second beam splitter is positioned at a second branching point to split light beams (which are inputted in the second beam splitter) at least in third light beams and fourth light beams; the fourth reflector is positioned to reflect the third light beams for forming at least a third set of the multiple sets of the light beams; and the fifth and sixth reflector are positioned to reflect the fourth light beams for forming at least the input light beams of the at least one optical arrangement.

Thus, by simply providing a further beam splitter and further three reflectors, the at least one third set of the multiple sets of the light beams is provided. The at least one third set of the multiple sets of the light beams may be used for one or more further points of convergence, thereby easily increasing the number of points of convergence, e.g. for enhancing the eye box of the display device. Besides that, also arranging the beam splitters in more than one direction may allow creating larger two-dimensional eye-boxes. Furthermore, adding the at least second beam splitter does not significantly increase the size of the optical system compared to a system with e.g. just one beam splitter.

In a further implementation form of the first aspect, the optical system comprises a further optical arrangement, wherein the reflected third light beams are the input light beams of the further optical arrangement, thereby forming at least the third and a fourth set of the multiple set of the light beams by the further optical arrangement. Thereby, with the further optical arrangement, the optical system can provide four points of convergence. Thus, e.g. the eye box of the display device can be enhanced.

In a further implementation form of the first aspect, the two optical arrangements are arranged for directing the multiple sets of the light beams to the beam forming element for providing at least three points of convergence on two different circles, wherein the circles have the same radius, and wherein each of the circles has a respective center, wherein the centers lie on a further circle having a further radius and a further center. Thus, the two optical arrangements may facilitate to easily provide the at least three points of convergence in a defined manner, e.g. for simplifying the design of the corresponding display device. Furthermore, the eye box of the optical system is effectively enlarged.

In a further implementation form of the first aspect, the at least one second beam splitter is positioned to direct the fourth light beams towards the further center, and the fourth reflector is distanced from the at least one second beam splitter at a third distance, wherein the sixth reflector is distanced from the fifth reflector at a fourth distance, and wherein each of the third distance and the fourth distance equals the further radius, thereby directing the first, second, third, and fourth set of the light beams to the beam forming element for providing at least four points of convergence on the circles. Thus, based on a predefined relative positioning of the four points of convergence, the beam splitters and reflectors can be easily positioned to one another for providing the four equally long multiple sets of light beams for the at least four points of convergence. Furthermore, a flat and compact optical system is thus achieved.

In a further implementation form of the first aspect, the second beam splitter is arranged to split the light beams at the second branching point such that the third light beams are oriented with respect to the light beams (which are inputted in the second beam splitter) at a defined second branching point angle.

In a further implementation form of the first aspect, the fifth reflector is positioned to reflect the fourth light beams such that the reflected fourth light beams are oriented with respect to the fourth light beams at an angle, which equals the second branching point angle. Thus, the design of the optical system for providing the equally long beam paths of the multiple sets of the light beams becomes very simple and compact.

In a further implementation form of the first aspect, the first beam splitter is arranged to split the input light beams at the first branching point such that the first light beams are oriented with respect to the input light beams at a defined first branching point angle.

In a further implementation form of the first aspect, the second reflector is positioned to reflect the second light beams such that the reflected second light beams are oriented with respect to the second light beams at an angle, which equals the first branching point angle. Thus, the design of the optical system for providing the equally long beam paths of the multiple sets of the light beams becomes very simple and compact.

In a further implementation form of the first aspect, each of the first beam splitter and/or the second beam splitter is a two-way beam splitter. The two-way beam splitter effectively prevents back reflections, which might occur when using a beam splitter splitting the light at least three-way (so called "X-cube").

In a further implementation form of the first aspect, the optical system includes a lens configured to collimate the input light beams so that the collimated input light beams are inputted in the at least one optical arrangement via the input of the at least one optical arrangement. In this way the input light beams, e.g. the light beams diverging from the light source, e.g. one light beam per pixel of the image to be formed, can be guided towards the user eye, for instance towards an exit pupil, such that a Maxwellian optical system is realized.

In a further implementation form of the first aspect, a distance between adjacent points of convergence is between 2-6 mm, particularly 3 mm. This distance is in the order of the typical pupil size of the human eye. This avoids on the one hand that multiple points of convergence can be seen by the user at the same time. On the other hand, not visibly annoying gaps are created between the convergent viewing points.

A second aspect of the disclosure provides a display device suitable for head-mounting. The display device comprises an optical system as previously described, and a light source configured to emit light beams for forming an image, wherein the emitted light beams are the input light beams.

In an implementation form of the second aspect, the light source is a laser scanning projector, particularly a MEMS projector, and wherein each of the emitted light beams relates to one pixel of an image to be formed. With such a laser scanning projector, in particular a Maxwellian display device can be easily realized, wherein the laser beams have a small width (below 0.5 mm, e.g. 0.1-0.5 mm), and are always focused on the retina.

The display device of the second aspect and its implementation forms achieve the same advantages and effects as the optical system of the first aspect and its respective implementation forms.

A third aspect of the disclosure provides an optical method. The optical method comprises the steps of: inputting input light beams in an optical arrangement via an input of the optical arrangement; forming, by the optical arrangement comprising at least one beam splitter and at least three reflectors, multiple sets of light beams from the input light beams such that the multiple sets of the light beams have equally long beam paths from the input to an beam forming element; and converging, by the beam forming element, the multiple sets of the light beams into at least two points of convergence.

The method of the third aspect can have implementation forms that correspond to the implementation forms described above for the first aspect and second aspect. Accordingly, the method and its possible implementation forms achieve the same advantages and effects as the optical system of the first aspect and the display device of the second aspect and their respective implementation forms.

A fourth aspect of the disclosure provides a computer program product comprising a program code for controlling an optical system as previously described or a display device as previously described or for performing, when the program code is executed on a computer, a method as previously described.

The computer program of the fourth aspect and its implementation forms achieve the same advantages and effects as the optical system of the first aspect, the display device of the second aspect and the method of the third aspect and their respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which FIG. 1 schematically shows an optical system according to an illustrative example provided in the disclosure.

DETAILED DESCRIPTION OF EMBODIMENTS

Figure 1:
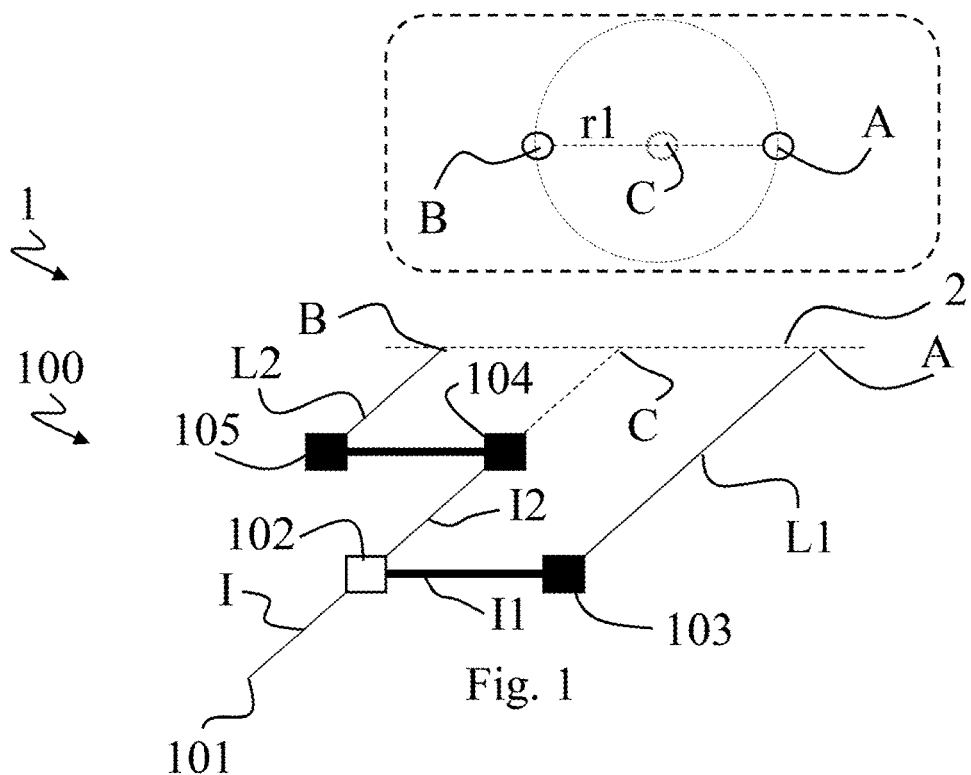

FIG. 1 shows an optical system 100 according to an illustrative example provided in the disclosure. The optical system 100 is particularly suitable for a display device. The display device may be particularly suitable for head-mounting, and may thus be referred to as a HMD device.

The optical system 100 comprises a beam forming element 2 configured to converge multiple sets of light beams into at least two points of convergence, which are different to one another. In the embodiment shown in FIG. 1, the multiple sets of light beams consist of two sets of multiple sets of light beams L1, L2, and correspondingly the beam forming element 2 converges the multiple sets of light beam L1, L2 into two points of convergence A, B. A set of the multiple sets of light beams may consists of a plurality of light beams, which are parallel to one another. The beam forming element 2 may be a (single) beam forming element. Alternatively, each set of the multiple sets of light beams may comprise a respective beam forming element. The beam forming element 2 may be a lens or another optical element, which is arranged to converge the parallel light beams of each set of the multiple sets of light beams in the respective point of convergence.

Each point of convergence corresponds to a different convergent viewing point for a user, e.g. when using the optical system in a display device, wherein each convergent viewing point provides the same image. Accordingly, when the user rotates one or both eyeballs, he or she can still observe one of the different convergent viewing points. As a consequence, the eye-box of the display device using the optical system 100 is enlarged.

The optical system 100 further comprises at least one optical arrangement. The optical arrangement comprises an input for input light beams. The input light beams may be light beams, which are emitted by a light source, which is configured to emit light beams for forming an image. For example, the light source is a laser scanning projector, e.g. a MEMS projector, and wherein each of the emitted light beams relates to one pixel of an image to be formed. Thereby, each set of the multiple sets of light beams, which are converged by the beam forming element, may correspond to the same pixel of an image, which may be viewed by a user using the optical system or a display device comprising the optical system.

The optical arrangement further comprises at least one beam splitter and at least three reflectors. The at least one beam splitter and at least three reflectors are positioned to form the multiple sets of the light beams from the input light beams such that the multiple sets of the light beams have equally long beam paths from the input to the beam forming element. That is the at least one beam splitter and at least three reflectors are positioned to split respectively redirect the input light beams such that the multiple sets of the light beams have equally long beam paths from the input to the beam forming element.

In the embodiment shown in FIG. 1, in particular in the lower part of FIG. 1 schematically showing a perspective view of the optical arrangement 100, the optical arrangement 100 comprises (only) one beam splitter 102 and (only) three reflectors 103, 104, 105 for forming the multiple sets of light beams L1, L2 for the (only) two points of convergence A, B. The optical arrangement 100 comprises an input 101 for the input light beams I. The beam splitter 102 is positioned at a first branching point such that the input light beams I are split in first light beams I1 and second light beams I2. The first reflector 103 is positioned such that the first light beams I1 are reflected for forming the first set L1 of the multiple sets of the light beams. The second reflector 104 and the third reflector 105 are positioned such that the second light beams I2 are reflected for forming the second set L2 of the multiple sets of the light beams. The distance, which the light travels from the input 101 via the beam splitter 102 and the reflectors 104, 105 to the beam forming element 2 equals the distance, which the light travels from the input 101 via the beam splitter 102 and the reflector 103 to the beam forming element 2. Thereby, the multiple sets of the light beams L1, L2 have equally long beam paths (or distances) from the input 101 to the beam forming element 2.

As shown in the upper part of FIG. 1, which schematically shows a lateral view of the optical system 1, when viewed in the direction of the multiple sets of light beams L1, L2, the two points of convergence A, B may be positioned such that the two points of convergence A, B are provided on a circle (shown in dashed lines) having a radius r1 and a center C. Since the two points of convergence A, B are positioned on a single circle, the embodiment of FIG. 1 comprises a single cocircular set. All points of convergence lie on a (single) final (pupil) plane. For easily providing the multiple sets of light beams L1, L2, the beam splitter 102 and the reflectors 103, 104, 105 may be positioned based on the geometrical properties of this circle. More specifically, the beam splitter 102 may be positioned such that the second light beam I2 is directed towards the center C and, in particular, perpendicular to the plane, in which the circle lies; the first reflector 103 may be positioned such that the first reflector 103 is distanced from the beam splitter 102 at a first distance being the radius r1, and the third reflector 105 and the second reflector 104 may be positioned such that the third reflector 105 is distanced from the second reflector 104 at a second distance being also the radius r1. Accordingly, the distance, which the light travels from the beam splitter 102 to the first reflector 103, equals the distance which the light travels from the second reflector 104 to the third reflector 104, thereby easily facilitating that the multiple sets of the light beams L1, L2 have equally long beam paths from the input 101 to the beam forming element 2.

The distance (in either the horizontal or vertical direction) between adjacent points of convergence, namely between the points of convergence A, B, may be from 2 mm to 6 mm and is, particularly, 3 mm. The value of 3 mm matches a typical pupil size of the human eye. Thus, the distance between adjacent points of convergence may be in the order of, or larger, than the pupil size. This avoids that different convergent viewing points come into the eye at the same time, i.e. that the user sees the image more than once. Notably, however, if on the other hand the distance gets too large, a gap will exist between adjacent convergent viewing points, which may lead to image loss when the eyeball is rotated or flickering caused due to the gap. Therefore, a proper distance between the convergent viewing points should be chosen. The distance between the convergent viewing points can to this end be adjusted by changing, for instance, the design of the optical arrangement 100 as previously described with respect to the circle having the radius r1.

The beam splitter 102 may be arranged to split the input light beams I at the first branching point such that the first light beams I1 are oriented with respect to the second light beams I2 at a defined first branching point angle, e.g. in the range from 5° to 90°, particularly in the range from 45° to 90°. For providing the equally long beam paths of the light beams L1, L2 in a particularly easy and compact manner, the second reflector 104 may be accordingly positioned to reflect the second light beams I2 to the third reflector 105, namely such that the reflected (being reflected to the third reflector 105) are oriented with respect to the second light beams I2 at an angle, which equals the defined first branching point angle.

The multiple sets of light beams L1, L2 may be parallel to one another. The input light beams I and/or the second light beams I2 may be parallel to one or more of the multiple sets of light beams L1, L2. The input light beams I and/or the second light beams I2, and one or more of the multiple sets of light beams L1, L2 may lie in the same plane; in other words the points of convergence A, B and the center C of the circle may all lie on a diagonal line of the circle. Thus, a very flat design of the optical system 1 and the optical arrangement 100 is provided. The points of convergence A, B may be alternatively provided on any position of the circumference of the circle; thereby, the input light beams I and/or the second light beams I2, and the multiple sets of light beams L1, L2 may also lie in different planes.

Figure 2:
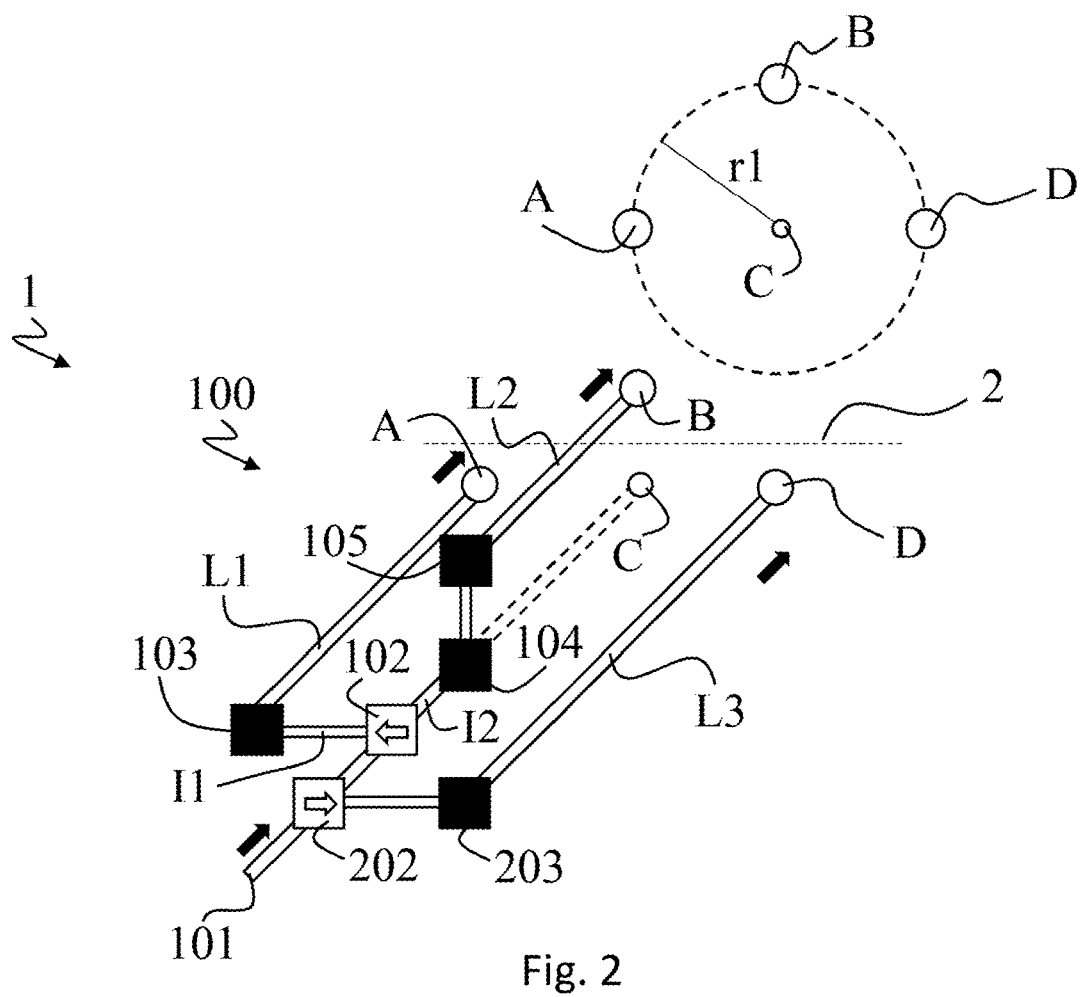
FIG. 2 schematically shows an optical system according to an illustrative example provided in the disclosure.

FIG. 2 schematically shows a further (second) embodiment of the optical system 1. The optical system 1 of the second embodiment is based on the previously described optical system 1 according to the first embodiment. Thus, what was described with respect to the first embodiment of the optical system 1 applies correspondingly to the optical system 1 according to the second embodiment. Same elements in FIG. 1 and FIG. 2 are labelled with the same reference signs and function likewise.

In the optical system 1 according the second embodiment, the optical arrangement 100 comprises in addition to the optical arrangement 100 of the first embodiment a further beam splitter 202, which is positioned in the beam path of the input light beams I between the beam splitter 102 and the input 101. The beam splitter 202 is thus positioned at a further branching point and splits the input light beams I in input light beams being inputted in the beam splitter 102 for providing the light beams I1 and I2 and in input light beams for forming a further set L3 of the multiple sets of the light beams. The further set L3 of the multiple sets of the light beams is directed to the beam forming element 2, which converges the set L3 into a further point of convergence D. Thus, the eye box of the optical system 1, in particular the eye box of a display device comprising the optical system 100, is enlarged in a very compact manner.

As shown in the lower part of FIG. 2, which is a perspective view of the optical system 1, the optical arrangement 100 of the second embodiment further comprises a further reflector 203, which is positioned to reflect the input light beams being provided (outputted) by the beam splitter 202 for forming the further set L3 of the multiple sets of the light beams. The further reflector 203 facilitates that the beam path of the further set L3, i.e. the beam path from the input 101 via the beam splitter 202 and the reflector 203 to the beam forming element 2 is equally long as the beam paths of the sets L1, L2 (from the input 101 to the beam forming element 2).

As shown in the upper part of FIG. 2, which schematically shows a lateral view of the optical system 1, when viewed in the direction of the multiple sets of light beams L1, L2, L3, the further point of convergence D may be also positioned on the circle, on which the two points of convergence A, B are positioned. Thus, the embodiment of FIG. 2 also comprises a single cocircular set. For easily providing the further set L3 of the multiple sets of light beams, the beam splitter 202 and the reflector 203 may be positioned based on the geometrical properties of this circle. More specifically, the beam splitter 202 may be positioned such that the light beam provided for being inputted in the beam splitter 102 is directed towards the center C and, particularly, perpendicular to the plane, in which the circle lies; the further reflector 203 may be positioned such that the further reflector 203 is distanced from the beam splitter 202 at a further distance being also the radius r1. Accordingly, the distance, which the light travels from the beam splitter 202 to the further reflector 203, equals the distance which the light travels from the beam splitter 102 to the first reflector 103 and the distance which the light travels from the second reflector 104 to the third reflector 104, thereby easily facilitating that the multiple sets of the light beams L1, L2, L3 have equally long beam paths from the input 101 to the beam forming element 2.

The point of convergence D is thus adjacent to the points of convergence A, B. The distance between the point of convergence D and the point of convergence A may be from 2 mm to 6 mm and is, particularly, 3 mm. The distance between the point of convergence D and the point of convergence B may be from 2 mm to 6 mm and is, particularly, 3 mm.

The beam splitter 202 may be arranged to split the input light beams I such that the light beams being directed to the reflector 203 for forming the further set L3 of the multiple sets of light beams are oriented with respect to the input light beams of the beam splitter 102 at a defined angle, e.g. in the range from 5° to 90°, in particular in the range from 45° to 90°. For providing the equally long beam paths of the light beams L1, L2, L3 in a particularly easy and compact manner, the defined angle of the light beams being directed to the reflector 203 may equal the previously described angle of the light beam I1 and/or reflected light beam I2.

The multiple sets of light beams L1, L2, L3 may be parallel to one another. The multiple sets of light beams L1, L2, L3 may lie in different planes, e.g. such that the sets L1, L2 lie in the same plane, wherein the set L3 lies in a different plane; in other words the points of convergence A, D and the center C of the circle may all lie on the diagonal line of the circle, wherein the point of convergence B does not lie on this diagonal line.

Figure 3:
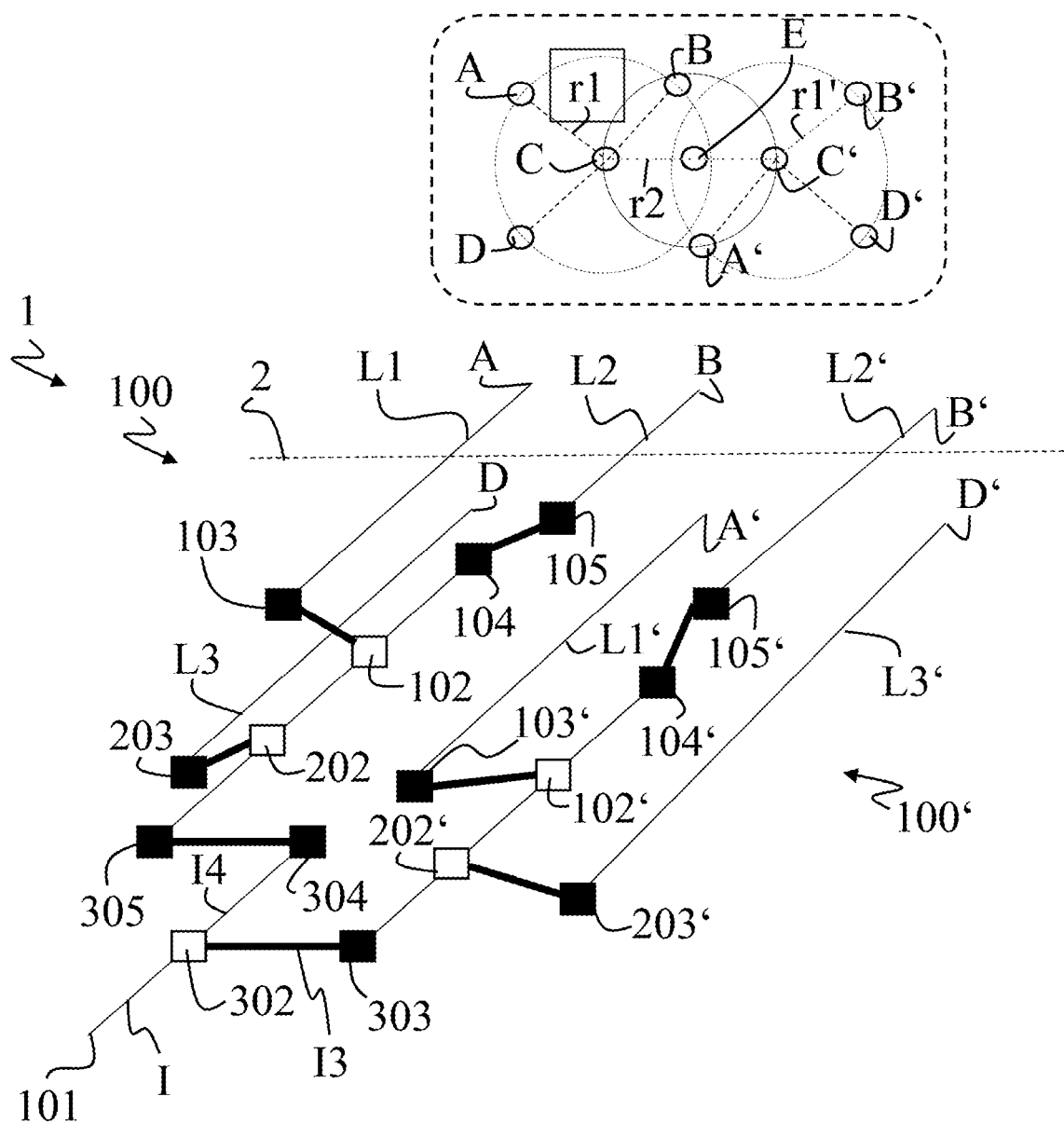
FIG. 3 schematically shows an optical system according to an illustrative example provided in the disclosure.

FIG. 3 shows a further (third) embodiment of the optical system 1. According to this embodiment, the optical system 100 further comprises a further (second) beam splitter 302 and a fourth reflector 303, a fifth reflector 304 and a sixth reflector 305. As shown in lower part of FIG. 3, which is a perspective view of the third embodiment of the optical system 1, the optical system 100 particularly comprises two of the previously described optical arrangements, which in FIG. 3 are depicted as the optical arrangement 100 (for forming at least the first and the second set L1, L2 and, particularly, also the set L3 of the multiple sets of light beams) and the further optical arrangement 100' (for forming at least a third and a fourth set L1', L2' and, particularly, also the set L3' of the multiple sets of light beams). Having the optical arrangements 100, 100', the optical system 1 therefore can provide points of convergence in the range from 4 to 6. In case of both optical arrangements 100, 100' not comprising the further beam splitter 202, 202', the points of convergence are 4. In case of the optical arrangement 100 or the optical arrangement 100' comprising the further beam splitter 202, 202', the points of convergence are 5. In case of both the optical arrangement 100 and the optical arrangement 100' comprising the further beam splitter 202, 202', the points of convergence are 6, as shown in FIG. 3.

The further (second) beam splitter 302 and the reflectors 303, 304, 305 are provided to provide the input light beams for the optical arrangements 100, 100' from the input light beams I. More specifically, the beam splitter 302 is positioned at a (second) branching point to split the input light beams I at least in third light beams I3 and fourth light beams I4. The fourth reflector 303 is positioned to reflect the third light beams I3 for forming at least one set of light beams for providing at least one point of convergence, i.e. a third set of the multiple sets of the light beams of the optical system 1. In the exemplary embodiment shown in FIG. 3, the fourth reflector 303 is thus positioned to reflect the third light beams I3 for inputting the light beams I3 reflected by the reflector 303 into the further optical arrangement 100' for forming the multiple sets of the light beams L1', L2', L3' of the optical system 1, thereby providing the points of convergence A', B', D'. Alternatively, the fourth reflector 303 may also be positioned to reflect the third light beams 13 for forming only one light beam of the optical system 1 for providing a corresponding point of convergence.

The fifth reflector 304 and the sixth reflector 305 are positioned to reflect the fourth light beams 14 for forming the input light beams of the optical arrangement 100. Thereby, the optical arrangement 100 is provided for forming the multiple sets of the light beams L1, L2, L3 of the optical system 1, thereby providing the points of convergence A, B, D.

As shown in the upper part of FIG. 3, which schematically shows a lateral view of the optical system 1, when viewed in the direction of the multiple sets of light beams, the two optical arrangements 100, 100' may be arranged for directing the multiple sets of the light beams L1, L2, L3, L1', L2', L3' to the beam forming element 2 for providing the points of convergence A, B, D, A', B', D', on two different circles, wherein these circles have the same radius r1, and wherein each of these circles has a respective center C, C', wherein the centers C, C' lie on a further circle having a further radius r2 and a further center E. Thus, the embodiment of FIG. 3 comprises not only one, but two cocircular sets. For easily providing the beam splitter 302 and the reflectors 303, 304, 305 such that all of the multiple sets of the light beams L1, L2, L3, L1', L2', L3' have equally long beam paths from the input 101 to the beam forming element 2, the beam splitter 302 and the reflectors 303, 304, 305 may be positioned based on the geometrical properties of the further circle. More specifically, the beam splitter 302 is positioned to direct the fourth light beams 14 towards the further center E, wherein the fourth reflector 303 is distanced from the beam splitter 302 at a third distance, and wherein the sixth reflector 305 is distanced from the fifth reflector 304 at a fourth distance. Each of the third distance and the fourth distance equals the further radius r2. The optical arrangements 100, 100' are provided based on the geometrical properties of the circle having the center C and the circle having the center C', respectively, as described herein above. Thereby, the points of convergence A, B, D, A', B', D' are provided on the two different circles having the centers C, C', respectively.

The optical arrangements 100, 100' may be positioned to one another such that the point of convergence A' is adjacent to the point of convergence D and that the point of convergence B' is adjacent to the point of convergence B. The distance between the point of convergence A' and the point of convergence D may be from 2 mm to 6 mm and is, particularly, 3 mm. The distance between the point of convergence B' and the point of convergence B may be from 2 mm to 6 mm and is, particularly, 3 mm. At least the distance between the convergent viewing points A' and D and between the convergent viewing points B' and B can to this end be adjusted by changing, for instance, the design of the optical arrangements 100, 100' by the further beam splitter 302 and the reflectors 303, 304, 305 as previously described with respect to the circle having the radius r2.

The beam splitter 302 may be arranged to split the light beams I at the second branching point such that the third light beams 13 are oriented with respect to the light beams, which are inputted into the beam splitter 302, at a defined second branching point angle, e.g. in the range from 5° to 90°, in particular in the range from 45° to 90°. For providing the equally long beam paths of the light beams L1, L2, L3, L1', L2', L3' in a particularly easy and compact manner, the fifth reflector 304 may be positioned to reflect the fourth light beams 14 such that the reflected fourth light beams are oriented with respect to the fourth light beams 14 at an angle, which equals the second branching point angle.

The beam splitter 302 and the reflectors 303, 304, 305 may be positioned such that the multiple sets of light beams L1, L2, L3 of the optical arrangement 100 are to the parallel to the multiple sets of light beams L1', L2', L3' of the optical arrangement 100'. For example the multiple sets of light beams L1, L2, L3, L1', L2', L3' may be positioned to one another such that the sets of light beams L1, L2, L2' lie in a first plane and that the sets of light beams L3, L1', L3' lie in a second plane; in other words, the centers C, C', E may lie on a first line, the points of convergence A, B, B' may lie on a second line, and the points of convergence D, A', D' may lie on a third line, wherein all three lines may be parallel to one another.

Each of the beam splitters 102, 202, 302 may be a two-way beam splitter. A two-way beam splitter is configured to split input light into only two separate parts of light. For example, the respective beam splitter may be configured such that one part of the input light is reflected by the beam splitter, wherein another part of the input light is transmitted through the beam splitter. The one part of the input light may be identical to the other part of the input light, in particular with respect to the number of light beams, intensity and color.

The optical system may comprise a lens, which is configured to collimate input light beams, e.g. diverging rays from the light source, so that the collimated input light beams, i.e. the input light beams I, are inputted in the input 101 and thus in the at least one optical arrangement 100, 100'. The lens may be for instance a Fresnel lens.

Notably, the above described optical systems 1 are laid out for one eyeball of the user. Of course, the optical system 1 can also be laid out for both eyeballs of a user. In this case, the optical system comprises for each of the eyeballs a respective optical system 1 as previously described. Accordingly, the light beams from the light source may be split into two light beams, which are guided to the optical systems 1. Also two (synchronized) light sources could be used, one for each eye.

Figure 4:
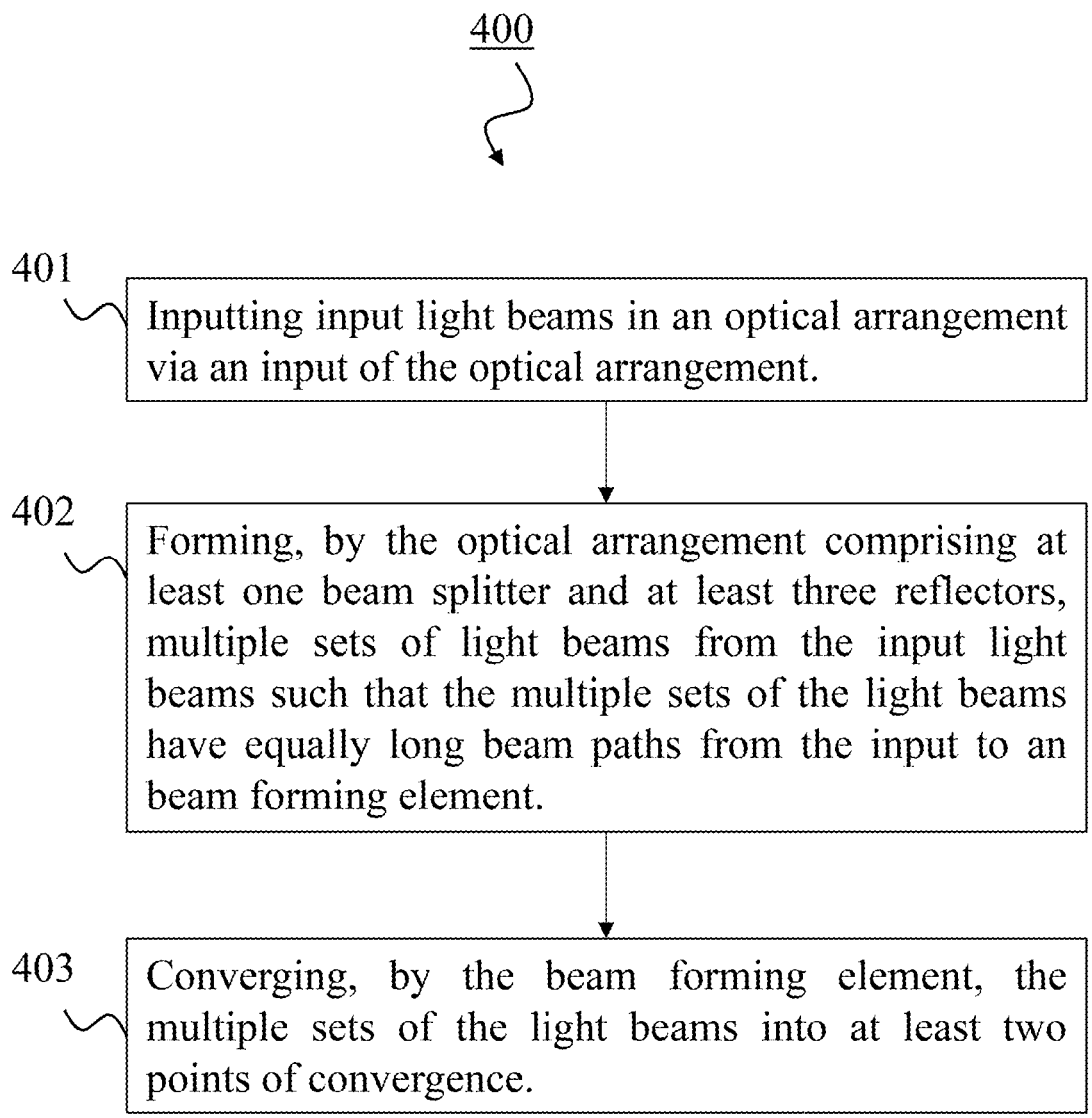
FIG. 4 shows a method according to an illustrative example provided in the disclosure.

FIG. 4 shows a method 400 according to an illustrative example provided in the disclosure. The method 400 comprises a step 401 of inputting input light beams I in an optical arrangement 100 via an input 101 of the optical arrangement 100, a step 402 of forming, by the optical arrangement 100 comprising at least one beam splitter 102, 202 and at least three reflectors 103, 104, 105, 203, multiple sets of light beams L1, L2, L3 from the input light beams I such that the multiple sets of the light beams L1, L2, L3 have equally long beam paths from the input I to an beam forming element 2, and a step 403 of converging, by the beam forming element 2, the multiple sets of the light beams L1, L2, L3 into at least two points of convergence A, B, D. The method 400 can be performed by any display device as explained above.

In summary, the present disclosure proposes using only an arrangement or a layout, in particular a tree structure, of beam splitters and reflectors in order to provide a beam path equalization for minimizing the spot size over the retina of an observer. Thus, with this arrangement the eye-box can be effectively enlarged, while simplifying the design of the optical system, in particular due to the reduced number of optical components and due to the use of less complex optical components, i.e. the use of only beam splitters and reflectors for the beam path equalization. This results also in a comparatively compact display device comprising the optical system.

The present illustrative examples provided in the disclosure have been described in conjunction with various illustrative examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An optical system for a display device suitable for head-mounting, comprising:
    a beam forming element configured to converge multiple sets of light beams into at least two points of convergence; and
    an optical arrangement configured to form the multiple sets of light beams, the optical arrangement comprising:
        an input for receiving input light beams,
        at least one beam splitter, and
        at least three reflectors;
        wherein the at least one beam splitter and the at least three reflectors are positioned to form the multiple sets of light beams from the input light beams such that light of the multiple sets of light beams traverse equally long beam paths from the input for receiving input light beams to the beam forming element.

2. The optical system according to claim 1,
    wherein the at least one beam splitter comprises a first beam splitter,
    wherein the at least three reflectors comprises a first reflector, a second reflector, and a third reflector; and
    wherein the first beam splitter provides a first branching point splitting the input light beams into:
        first light beams, and
        second light beams,
    wherein the first reflector is positioned to reflect the first light beams from which at least a first set of light beams, of the multiple sets of light beams, is formed, and
    wherein the second reflector and the third reflector are positioned to reflect the second light beams from which at least a second set of light beams, of the multiple sets of light beams, is formed.

3. The optical system according to claim 2, wherein the at least one optical arrangement is configured to provide the at least two points of convergence within a circle, wherein the circle has a radius and a center,
    wherein the first beam splitter is positioned to direct the second light beams towards the center,
    wherein the first reflector is distanced from the at least one beam splitter at a first distance,
    wherein the third reflector is distanced from the second reflector at a second distance, and
    wherein each of the first distance and the second distance equals the radius, thereby directing the first set of light beams and the second set of light beams to the beam forming element for providing the at least two points of convergence within the circle.

4. The optical system according to claim 2,
    wherein the at least one beam splitter comprises a second beam splitter, and
    wherein the at least three reflectors comprises a fourth reflector, a fifth reflector, and a sixth reflector,
    wherein the second beam splitter provides a second branching point splitting light beams into:
        third light beams, and
        fourth light beams,
    wherein the fourth reflector is positioned to reflect the third light beams from which at least a third set of light beams, of the multiple sets of light beams, is formed, and
    wherein the fifth reflector and the sixth reflector are positioned to reflect the fourth light beams for forming input light beams of the at least one optical arrangement.

5. The optical system according to claim 4,
    wherein the at least one optical arrangement comprises a further optical arrangement,
    wherein the reflected third light beams from the fourth reflector are input light beams of the further optical arrangement, thereby forming at least the third set of light beams and a fourth set of light beams, of the multiple sets of the light beams, by the further optical arrangement.

6. The optical system according to claim 5, wherein a first optical arrangement and the further optical arrangement of the at least one optical arrangement are arranged for directing the multiple sets of light beams to the beam forming element for providing at least three points of convergence on a first circle and a second circle,
    wherein the first circle and the second circle have a same radius,
    wherein each of the first circle and the second circle has a distinct center, and
    wherein each one of the first circle and the second circle lies on a third circle having a third radius and a third center.

7. The optical system according to claim 6,
    wherein the at least one second beam splitter is positioned to direct the fourth light beams towards the third center,
    wherein the fourth reflector is distanced from the at least one second beam splitter at a third distance,
    wherein the sixth reflector is distanced from the fifth reflector at a fourth distance, and
    wherein each of the third distance and the fourth distance equals the third radius,
    thereby directing at least the first set of light beams, second set of light beams, third set of light beams, and fourth set of the light beams to the beam forming element for providing at least four points of convergence within the circles.

8. The optical system according to claim 4, wherein the second beam splitter is arranged to split received light beams at the second branching point such that the third light beams are oriented with respect to the received light beams at a defined second branching point angle.

9. The optical system according to claim 8, wherein the fifth reflector is positioned to reflect the fourth light beams such that reflected fourth light beams from the fifth reflector are oriented with respect to the fourth light beams at an angle that equals the second branching point angle.

10. The optical system according to claim 2, wherein the first beam splitter is arranged to split received light beams at the first branching point such that the first light beams are oriented with respect to the received light beams at a defined first branching point angle.

11. The optical system according to claim 2, wherein the second reflector is positioned to reflect the second light beams such that reflected second light beams from the second reflector are oriented with respect to the second light beams at an angle that equals the first branching point angle.

12. The optical system according to claim 2, wherein the first beam splitter and/or the second beam splitter is a two-way beam splitter.

13. The optical system according to claim 1, wherein the optical system includes a lens configured to collimate the input light beams so that the collimated input light beams are input in the at least one optical arrangement via the input of the at least one optical arrangement.

14. The optical system according to claim 1, wherein a distance between adjacent points of convergence is between 2-6 mm.

15. A display device suitable for head-mounting, comprising:
    an optical system according to claim 1, and
    a light source configured to emit light beams for forming an image, wherein the emitted light beams are the input light beams.

16. The display device according to claim 15, wherein the light source is a laser scanning projector, and wherein each of the emitted light beams relates to one pixel of an image to be formed.

17. An optical method, comprising:
    inputting input light beams in an optical arrangement via an input of the optical system of claim 1,
    forming, by the optical arrangement comprising at least one beam splitter and at least three reflectors, multiple sets of light beams from the input light beams such that the multiple sets of the light beams have equally long beam paths from the input to a beam forming element, and
    converging, by the beam forming element, the multiple sets of the light beams into at least two points of convergence.

* * * * *